United States Patent Office 3,372,094
Patented Mar. 5, 1968

3,372,094
PROCESS OF MAKING CITRIC ACID BY FERMENTATION
William Gold, Spring Valley, N.Y., and Robert Kieber, Locust, N.J., assignors to Stepan Fermentation Chemicals, Inc., Keyport, N.J., a corporation of Delaware
No Drawing. Continuation-in-part of applications Ser. No. 74,793, Dec. 9, 1960, and Ser. No. 208,899, July 10, 1962. This application May 19, 1966, Ser. No. 551,194
5 Claims. (195—36)

ABSTRACT OF THE DISCLOSURE

In the production of citric acid by fermentation, fatty material in amount of 0.05–0.3% v./v. is maintained in the medium throughout the fermentation. Increased yield and rate of fermentation are realized.

---

This application is a consolidation and a continuation-in-part of application Ser. No. 74,793, filed Dec. 9, 1960, and application Ser. No. 208,899, filed July 10, 1962, now abandoned.

This invention relates to the production of acyclic organic acid by fermentation and has as its object improvement in the fermentation method.

A large number of organic acids can be produced by including in a fermentation medium containing a fermentable carbon source, an organism for production and accumulation of organic acid, and maintaining the medium for a time and at conditions for production of the acid by fermentation of the carbon source. It has been found that improvement in acid production in the form of higher yields and/or faster fermentation rates, can be realized by maintaining metabolizable fatty material present in the medium during the fermentation.

In the prior art, fatty materials have been included in fermentation mediums in order to suppress or dissipate foam. See U.S. Patent 2,739,923, issued Mar. 27, 1956, to Martin. It has also been suggested to use fatty oils in the production of penicillin. This is described in Penicillin-Efficient Utilization of Fatty Oils As Energy Source In Penicillin Fermentation, S. C. Pan et al., Applied Microbiology, vol. 7, No. 3, p. 176, May 1959. It has not been recognized, however, that fatty materials improve fermentation processes for producing acyclic acids, in particular, citric acid, by providing better yields or faster fermentation rates, and accordingly the fatty materials have not been used in such processes in a way which results in realizing the full advantage obtainable from the effect of the fatty material on the fermentation reaction. Thus, the foaming which the fatty materials are used to counteract, commonly occurs during merely a part of the fermentation, e.g. during the early part or during the first half of the fermentation. Upon reduction of foaming to below an objectionable level no more fatty material is added and following consumption of the fatty material present, the fermentation is allowed to continue in the absence of fatty material.

Accordingly to the invention, fatty material is advantageously maintained in the medium throughout the fermentation, and in this way there can be realized the full advantage of increased yield and/or rate of fermentation as well as the counteracting of foam.

In reference to the prior art processes for production of acyclic acids wherein fatty material has been used, the initial pH of the fermentation medium is commonly a relatively high value, for example in excess of about 5, and as the fermentation occurs the pH drops in correspondence to production of the acid, and to below about 3, e.g. to about 2.0–2.5. The foaming occurs to an objectionable extent, for the most part, only during the earlier part of the fermentation, e.g. during the interval in which the pH is above about 3. Yet most or a substantial part of the acid production may occur during the interval in which the pH is below about 3. Accordingly, it is the particular concern of the invention to maintain fatty material present during the interval in which the pH of the medium is below about 3.

The fatty material is consumed during the fermentation and it is desirable to maintain the concentration above a certain value which depends on the particular fermentation. The concentration maintained can be from a small amount effective to improve yield or rate, e.g. 0.05% v./v. up to 0.3% v./v. A preferred range is 0.1–0.2% v./v. This level of fatty material concentration can be maintianed throughout the fermentation, and it is desirable to add the fatty material gradually in order to maintain the selected level. It is undesirable to add larger amounts than those indicated since commonly the organism can metabolize either the substrate material or the fatty material and has a preference for the fatty material. Accordingly, unless a level higher than the level mentioned for the purpose of the invention is necessary in order to limit foaming (and in general this will not be the case as the level for the purpose of the invention is usually as much as the level required to limit foaming), the selected level is provided by gradual addition. Addition can be carried out by procedures known in the art for addition of antifoams.

In a typical fermentation in which the procedure of the invention is useful, the initial level can be 0.1–0.2% v./v. and the fermentation can be continued, without addition of more fatty material and until the growth of the mold becomes complete. This period can be for example a day and a half. At the conclusion of the day and a half, continuous addition can be commenced, or alternatively gradual intermittent addition can be employed. Where intermittent addition is used, the change in cloudiness of the mash, due to the mash becoming clearer upon consumption of the fatty material, can be used as an indication of the need for addition of fatty material.

As to the fatty materials which are suitable it is believed, on the basis of experiments, that the effective material is free fatty acid. The acid can be added as such to the mash or it can be added as an ester, for example, a glyceride. Where the acid as such is added, difficulty may be encountered in dispersing it so that it is suitably incorporated into the mash. During initial stages of the fermentation when the pH of the medium is relatively high, e.g., 5–8, it is convenient to use the ester or glyceride as these are hydrolyzed by enzymes at a rate sufficient to provide the required amount of free acid. As the pH falls, however, the rate of hydrolysis slows down, so that at the lower pH values, e.g., below about 4, free acid additions is desirable. Glycerides or esters can, however, be utilized for the entire fermentation.

The fatty material can be of a free acid of the formula RCOOH wherein R is aliphatic (for example alkyl), saturated or unsaturated, and containing 3–21, preferably 15–17, carbon atoms. When the free acid is added, it can be added as the alkali or alkaline earth soap, e.g. the sodium, potassium or calcium salt. If the fatty material is an ester, it can be of the formula $RCOOR^1$, wherein R is as above and $R^1$ is aliphatic (for example alkyl), saturated or unsaturated, and having from 1–20, preferably 1–3 carbon atoms. Where a glyceride is employed as the fatty material, it can be a mono-, di-, or tri-glyceride wherein the acid moiety or moieties are according to formula given above for the free acid.

The preferred fatty glycerides are the tri-glycerides, such as for example animal and vegetable derived tri-glycerides. Examples of suitable glycerides are butter, beef-fat, mutton-fat, lard oil, olive oil, corn oil, soy oil, cottonseed oil, rape oil, ground-nut oil, palm oil, cocoa butter, laurel fat and nutmeg butter, linseed oil, hemp oil, poppy-seed oil, tall oil, and wood oil. As between the animal derived and vegetable derived oils, the vegetable derived are of course preferred since this leaves the ultimated product unencumbered with the stigma of utilization of animal derived materials in its preparation, i.e., if vegetable oil is used, the citric acid produced can be Kosher. If desired, mixtures of glycerides can be used.

Other suitable fatty materials are methyl stearate, methyloleate, oleic acid.

Commercially available materials which are suitable are Swift No. 560, Hodag KG11, and Atmos 300. Some fatty materials found to be unsatisfactory are Hodag KG-1, Hodag KF, and mineral oil.

Where oils are used as the fatty material, the crude oil, i.e., the soil as pressed, can advantageously be used as the oils in this form have antifoam value.

Where free fatty acids are used, as noted above, difficulty may be encountered, especially if good agitation is not provided, in suitably incorporating the free fatty acid into the mash. It has been found that the addition is greatly facilitated by adding the acid as a water emulsion, i.e., a water-fatty acid emulsion wherein water is the continuous phase. This can be, for example, a 50% v./v. water emulsion. Mineral oil emulsions of the acid are not desirable because the mineral oil may have an inhibitory effect on the fermentation. The difficulty in dispersing the oil is encountered in laboratory work, especially test tube runs. In general, difficulty is not encountered in production where a tank outfitted with an agitator is used.

The carbon sources which are suitable for use in the procedure of the invention are those commonly used for production of organic acids, especially citric acid. It can be sugar, beet molasses, high-test molasses, blackstrap molasses, or starch hydrolysates and the carbon source can be in the refined or unrefined condition.

The acid producing organism can be appropriate to the acid or acids which it is desired to produce. It can be, for example, of the groups Aspergillus, Citromyces, Penicillium and Monilia. Black Aspergillus, particularly *Aspergillus niger*, are well suited. Suitable strains are *Aspergillus japonicus*, *Aspergillus clavatus*, *Paecyclomyces divaricatum*, *Mucor piriformis*, *Penicillium luteum*, and *Penicillium citrinum*. The organism, upon introduction into the fermentation medium can be in the form of mycelium, spores, pre-germinated spores or comminuted mat.

The fermentation can be by the pan or the deep tank procedure.

The effectiveness of the procedure can be demonstrated by test tube fermentations. Following initial addition of fatty material and growth of the mold, intermittent addition can be employed and the mash analyzed periodically to determine the effectiveness of the additions on the acid production rate.

For some fermentations carried out in this manner, it has been found that following initial addition of fatty material and growth of the mold to full size over about a day and a half, subsequent intermittent additions can be made, and following each subsequent addition, fermentation rates increase and then decrease with time. The subsequent additions result in increase of the fermentation rates and the rates then fall off as the fatty material is consumed until the next addition whereupon the rate is again increased, and so on. Where the fatty material is free acid, the response to addition is found to be quicker and greater in magnitude, than where the corresponding esters of lower alkyl alcohols are added. Thus, for free acids, full response may take place in about 1 hour, whereas for the ester the full response may require about 2 hours.

In a preferred embodiment of the invention the fermentation is carried out in accordance with Patent 3,285,828. Thus, preparatory to the fermentation, there is added to a fermentation medium containing a suitable fermentable carbon source and in cool, sterile condition, a sterile ferrocyanide or ferricyanide salt, and a citric acid producing and accumulating organism for production of citric acid from the carbon source, and the resulting cool medium containing the salt and organism is provided at a pH of about 6–9.

A preferred pH range for the medium is about 6.5–9 and commonly the preferred pH range is about 7–8 and, for cane blackstrap molasses, the ranges of about 6.5–9, preferably about 7–8, have particular application. Commonly for cane blackstrap molasses the optimum value is about 8. The optimum value is related to the degree of impurity. In general, the more impure the medium the higher the optimum pH value.

The iron cyanide salt can, in general, be any salt soluble in the fermentation medium, e.g. water soluble iron cyanide salts, preferably inorganic salts such as sodium or potassium salts. The ferrocyanide or ferricyanide salts can be used.

The pH of the medium can be adjusted by addition to the medium of an aqueous solution of a pH adjusting agent. In the case of impure cane derived sources the natural pH of aqueous solutions thereof will usually be on the acid side and below about 5.5. Thus, in the case of cane blackstrap molasses, the natural pH of the aqueous solutions is commonly about 4.8–5.2. For adjusting the pH of such solutions, calcium hydroxide, calcium oxide, sodium hydroxide, and the like can be used to raise the pH into the range of about 6–9, which is the pH condition of the invention for the medium. The preferred pH is about 7–8 and, for cane blackstrap molasses, optimum pH is usualy about 8. The optimum value is related to the degree of impurity. In general, the more impure the medium, the higher the optimum pH value.

The procedure for the fermentation involves forming an aqueous fermentation medium by dissolving the carbon source in water to provide a solution wherein the concentration of the carbon source is limited so that the fermentation rate is not inordinately low. Where the carbon source is cane blackstrap molasses, the amount of molasses in the aqueous solution can be about 20–40% w./v. molasses depending on the particular molasses employed. This corresponds to a total sugar (as sucrose) content of about 10–26% w./v. Amounts of carbon source can be outside the mentioned range and can be either more or less, but in general this will result in reduced efficiency for the process. Commonly, addition of nutrients other than the carbon source is not required. Where, however, the carbohydrate source is deficient in respect to nutrient materials, the additions, e.g., of nitrogenous material or mineral material such as phosphorous compounds, are desirable.

The fermentation medium is then sterilized with heat. The sterilization is carried out in the usual manner, i.e. by heating the medium at a temperature of usually at least about 100° C. to destroy organisms present therein which would interfere with the fermentation.

The hot sterile medium is then cooled from sterilization temperature and the iron cyanide salt, in sterile and preferably cooled condition, and the organisms for the fermentation, and the pH adjusting reagent are then added to the medium. Specific organisms suitable for the purposes of the invention are ATCC 10577 and ATCC 11414. ATCC 10577 is strain XX11 for citric acid production of J. A. Benkiser, Plant, Ladenberg, Germany. ATCC 11414 is Wisconsin strain 72–4, used by Martin in Patent 2,739,923, issued Mar. 27, 1956, and described in J. Bacteriology, vol. 52, p. 555. Usually, there will be an optimum amount of inoculum, especially where the fermentation is carried out in a deep tank, as when the amount of inoculum is excessive, aeration is interfered with to the extent that yield is reduced. This is commonly the case where a germinated inoculum is employed, and in each case, advantageously, the inoculum is used in an amount predetermined to provide relatively high yields. The optimum amount can be determined by experiment. The fermentation can then be carried out by maintaining the medium at fermentation conditions for a suitable time.

It is important that the sterile fermentation medium be cooled before the iron cyanide salt is added thereto. The temperature to which it is cooled can be in the range of about ambient temperature to about 75° C., and preferably about ambient temperature to about 50° C., for example 40° C., and optimally about ambient temperature to about 30° C. While the temperature, at which the iron cyanide salt is added can be in excess of 50° C., this is undesirable, since the procedure of the invention is then of substantially less effectiveness. The medium can be cooled to below 30° C. before addition of the salt but this would not provide any advantage and would usually be inconvenient since the usual temperature for the fermentation is about 30° C.

The iron cyanide salt added to the fermentation medium can be in the form of a sterile, aqueous solution thereof. This can be provided by dissolving the iron cyanide salt, commercial grade, in water and then sterilizing with heat. When sterilized in this manner, the salt solution is preferably concentrated, e.g. a 10% w./v. solution of the salt. The amount of the salt added to the fermentation medium can be about 0.05–0.4% by weight per 20% w./v. of molasses present in the fermentation medium. Amounts, either more or less, outside this range can be used, but the mentioned range is preferred. In general, within the preferred range there will be an optimum amount of the salt. The optimal amount will usually depend on the particular carbon source used, for example the particular cane blackstrap molasses, and it can be determined by testing to provide the best time-yield relationship. The variation in yield, even over a narrow range such as 0.05–0.4% by weight of the salt, is commonly as much as 75% of the optimum yield. The amount of the salt solution added to the fermentation medium will in general be small in comparison to the fermentation medium, e.g., 1%, and the salt solution added will not substantially alter the molasses concentration in the medium. Advantageously, the salt solution is cooled before addition to the medium. The temperatures mentioned herein as suitable, preferable, etc. for the medium apply similarly to the salt solution.

It is important in order to realize the full benefits of the pH adjustment that the pH of the medium at the beginning of the fermentation be in the range of about 6–9 or 6.5–9, preferably about 7–8 and optimally about 8. Preferably, the adjustment in pH is made after sterilization and when the medium is in the cooled condition. Thus, in the case of impure cane derived carbon sources, such as for example, cane blackstrap molasses, reducing sugars are degraded if the sterilization is carried out at an elevated pH. The degradation can be avoided by sterilizing before adjusting the pH.

When the pH is adjusted after sterilization, it should be done aseptically as is the addition of iron cyanide salt. The suitable and preferred temperatures for adjustment of pH are in general the same as those for the addition of the iron cyanide salt.

A distinctive feature of the procedure of the invention is the provision of the medium containing the iron cyanide salt in sterile condition without sterilizing the medium with heat when the salt is present therein. Further, as described above, sterilizing with heat when the medium is at the initial pH for the fermentation should be avoided. Normally, these requirements will necessitate the procedure described above of separately sterilizing the medium containing the carbon source, without the iron cyanide salt, and at the natural pH, and thereafter adding to the cooled medium the iron cyanide salt and adjusting the pH of the cooled medium. If, however, a means of sterilizing other than by application of heat is resorted to, it will be apparent that the improvement of the invention can be realized by providing a cool fermentation medium containing the carbon source, including in the cool medium the iron cyanide salt, and providing the medium containing the salt in sterile condition while in said cooled condition, and further providing the cool sterile fermentation medium at the desired initial pH for the fermentation.

EXAMPLES

The fermentation, by the submerged culture procedure, can be carried out in a manner known in the art. Thus, the fermentation can be carried out in a deep tank wherein the medium is agitated and aerated with air or other oxygen containing gas. The temperature for the fermentation can be in the range of about 25–35° C., preferably 29–32° C., and optimally 31° C. Atmospheric, or if desired, slightly elevated pressure in order to preclude harmful leakage, can be employed. The fermentation period can be two days or longer.

Alternatively, the fermentation can be carried out by the shallow pan procedure.

The invention is further described in the following examples.

*Example 1*

A synthetic medium of the following composition was employed as the fermentation mash.

|  | Grams |
|---|---|
| Sucrose | 140 |
| $NH_4NO_3$ | 2.25 |
| $KH_2PO_4$ | 0.50 |
| $K_2HPO_4$ | 0.50 |
| $MgSO_4 \cdot 7H_2O$ | 0.25 |
| $FeSO_4 \cdot 7H_2O$ | 0.005 |
| Distilled water, to 1 liter. | |

This medium has a pH of 6.5. Following autoclaving of the medium in acid washed glassware, 10 ml. thereof was placed in each of several 1″ x 6″ test tubes. The medium in several of the tubes was then inoculated with ATCC 10577 culture as spores or germinated inoculum. For the spore inoculation 0.1 ml. of an aqueous spore suspension was added; and for the germinated spore inoculum, spores were germinated on synthetic medium as specified herein by shaking at 31° C. for 24 hours, and 0.1 ml. and 1.0 ml., respectively, were added to two sets of the tubes.

The fatty material employed was crude soy oil and 0.1 was added to some of the tubes at the commencement of the fermentation. No oil was added to the other tubes and these served as controls. The fermentations were carried out by maintaining the tubes at 31° C. for 7 days while shaking at 270 r.p.m. The results, expressed as percent acid as citric are set forth in the following table. The runs were carried out in duplicate.

TABLE I

| Inoculum | Yield, Percent Acid as Citric | | | |
|---|---|---|---|---|
|  | No Oil Added | | Oil Added | |
| 0.1 ml. spores | 2.3 | 2.9 | 3.8 | 3.3 |
| 0.1 ml. germ. spores | 2.8 | 2.8 | 3.9 | 3.1 |
| 1.0 ml. germ. spores | 1.6 | 1.5 | 1.5 | 1.3 |

*Example 2*

A fermentation medium is prepared in a 6″ x 18″ Pyrex jar provided with a stirrer and sparger for aeration. A 4 liter aqueous solution of cane blackstrap molasses containing 20% w./v. molasses which provides a total sugar content for the solution of about 12% w./v., is introduced into the jar. This mash is sterlized, cooled to about 30° C. and there is added thereto 8 grams of potassium ferricyanide contained in a cool, sterilized 10% aqueous solution thereof, and the solution is then adjusted from a natural pH for the solution of 5 to pH 6.1 with calcium hydroxide.

For inoculation of the fermentation medium, 20 ml. of an aqueous suspension of germinated spores of an *Aspergillus sp.* is added aseptically to the fermentation medium. Germination is effected in a synthetic medium. The inoculum-containing medium is agitated and aerated at 31° C. for 6 days. Soy oil in amount of 0.1% v./v. is added at the beginning and periodically during the fermentation to maintain it at about this level.

Citric acid is obtained in good yield, e.g. in excess of 5%.

Example 3

A fermentation medium is prepared by charging a 2,000 gallon capacity deep tank fermentor with 1,700 gallons of water diluted cane blackstrap molasses. The diluted molasses is 25% w./v. 79 Brix molasses, and has a sugar (as sucrose) content of 13.1% w./v. The dilute molasses is sterlized at 100° C. for 15 minutes, and then cooled to 30° C. An aqueous solution of 24 pounds of sodium ferrocyanide and 32 pounds of calcium hydroxide in 20 gallons of water is sterlized by heating to 100° C. cooled to about room temperature, and then added to the sterilized and cooled contents of the fermentor. Following this addition, the pH of the medium is 7.8.

For inoculation of the fermentation medium, a 500 ml. aqueous suspension of spores of an *Aspergillus sp.* is introduced into the tank. Soy oil in amount of 0.1% v./v. is then added and the fermentation is thereafter carried out at 31° C. and with agitation and aeration. Soy oil is added as is necessary to maintain it in the range of 0.05–0.3% v./v. The fermentation time is 6 days.

Citric acid, calculating the percent acid as citric acid, is in excess of 5%.

The citric acid production reported in the specification as "percent acid as citric" is percent w./v. of acid in the fermented medium calculated as anhydrous citric acid. The acidity of the fermented medium was determined by titration. Of the total acid present 95% or more is citric.

The above-mentioned application Ser. Nos. 74,793 and 208,899 are incorporated herein by reference.

What is claimed is:

1. The method of producing citric acid by fermentation of a fermentable carbon source, which comprises adding to a cool, sterile fermentation medium including the fermentable carbon source, sterile salt selected from the group consisting of ferrocyanide and ferricyanide salts, and a citric acid producing and accumulating organism for the production of citric acid from the carbon source, to provide a cool fermentation medium containing said salt and said organism, providing the cool fermentation medium containing said salt and said organism at a pH of about 6–9, maintaining the thus constituted fermentation medium for a time and at conditions for production of citric acid by fermentation of the carbon source, and maintaining fatty material present in the medium throughout the fermentation at a concentration of at least 0.1% v./v.

2. The method of claim 1, wherein the fatty material is added gradually during the fermentation.

3. The method of claim 1, wherein the fatty material is selected from the group consisting of free fatty acid, metal salts of fatty acids, and esters of fatty acids, wherein the fatty acid moiety contains about 3–21 carbon atoms.

4. The method of producing citric acid by fermentation of a fermentable carbon source, which comprises providing a cool fermentation medium including the fermentable carbon source, including in said cool medium a salt selected from the group consisting of ferrocyanide and ferricyanide salts, providing the medium containing said salt in sterile condition while in said cooled condition, including in the cool, sterile fermentation medium a citric acid producing and accumulating organism for production of citric acid from the carbon source, providing the cool, sterile fermentation medium containing said organism at a pH of about 6–9, maintaining the thus constituted fermentation medium for a time and at conditions for production of citric acid by fermentation of the carbon source, and maintaining fatty material present in the medium throughout the fermentation at a concentration of at least 0.1% v./v.

5. The method of claim 1, wherein the fatty material is maintained at a concentration of about 0.1–0.2% v./v. throughout the fermentation.

References Cited

UNITED STATES PATENTS

| 2,739,923 | 5/1956 | Martin | 195—36 |
| 2,890,989 | 6/1959 | Anderson | 195—78 |
| 2,911,339 | 11/1959 | Goodman | 195—80 |
| 3,013,947 | 12/1959 | Bessell et al. | 195—80 |

OTHER REFERENCES

Pan et al., Applied Microbiology 7, 176–180, May 1959.

LIONEL M. SHAPIRO, *Primary Examiner.*

A. LOUIS MONACELL, *Examiner.*